United States Patent [19]
Clements et al.

[11] Patent Number: 5,131,670
[45] Date of Patent: Jul. 21, 1992

[54] DETACHABLE SCUBA TANK OVERLAND TRANSPORT DEVICE

[75] Inventors: D. Gene Clements; Robert R. Morrison, both of Ocala, Fla.

[73] Assignee: Scubagear Inc., Ocala, Fla.

[21] Appl. No.: 635,748

[22] Filed: Dec. 28, 1990

[51] Int. Cl.[5] .................................................. B62B 1/20
[52] U.S. Cl. ........................................ 280/35; 248/128; 248/154; 280/645; 280/652; 280/79.5; 294/26; 294/159
[58] Field of Search ...................... 294/15, 26, 33, 159; 248/129, 154; 269/17, 254 R, 133, 901; 220/630, 636, 85 H, 94 R, 94 B, 95, 96; 280/35, 40, 47.29, 79.5, 47.26, 645, 652, 651

[56] References Cited

U.S. PATENT DOCUMENTS

| | | | |
|---|---|---|---|
| D. 184,962 | 4/1959 | Ress . | |
| 1,949,607 | 3/1934 | Harrold | 248/154 X |
| 1,955,463 | 4/1934 | Lathrop | 280/35 X |
| 2,131,673 | 9/1938 | Robinson . | |
| 2,287,919 | 6/1942 | Ulzheimer | 248/154 X |
| 2,321,824 | 6/1943 | Knight | 248/154 |
| 2,396,368 | 3/1946 | Gorrell et al. | 280/79.5 X |
| 2,467,075 | 4/1949 | Birnberg . | |
| 2,467,076 | 4/1949 | Birnberg . | |
| 2,595,269 | 5/1952 | Keys . | |
| 2,611,639 | 9/1952 | Sadeck | 220/95 X |
| 2,719,689 | 10/1955 | Umstead | 248/154 X |
| 2,750,140 | 6/1956 | Smith | 248/154 |
| 2,809,847 | 10/1957 | Sperlich . | |
| 2,917,769 | 12/1959 | Kasper | 280/79.5 X |
| 3,301,570 | 1/1967 | Berman | 280/47.131 |
| 3,774,931 | 11/1973 | Stelniceanu . | |
| 4,026,435 | 5/1977 | Hendon | 220/94 R X |
| 4,168,025 | 9/1979 | Bantner | 294/159 |
| 4,544,173 | 10/1985 | Kellermyer . | |
| 4,666,179 | 5/1987 | Adams . | |
| 4,754,893 | 7/1988 | Dunn | 220/95 X |
| 4,815,761 | 3/1989 | Henderson et al. . | |
| 4,953,879 | 9/1990 | Cain et al. . | |

*Primary Examiner*—Andres Kashnikow
*Assistant Examiner*—Michael Mar

[57] ABSTRACT

A wheeled device for enabling a scuba tank or the like to be moved overground, instead of the user having to carry it, this device having an elongate axle, adjacent each end of which a wheel is rotatably amounted. A pair of tank-engaging members are utilized in connection with the axle, such members being movable between a nested position, in which the members require minimum storage space, and a position in which the members are separated to a limited extent. One of the members has a support platform for supporting a scuba tank, and each of the members has a sidewall-engaging portion for engaging the sidewall of a scuba tank inserted between the sidewall-engaging portions, to rest upon the support platform. Thus, when the scuba tank is resting on the support platform of the one member, the sidewall-engaging portions of both members tightly grasp the sidewalls of the scuba tank, such that the wheeled device does not drop off should the user lift only the scuba tank.

20 Claims, 4 Drawing Sheets

DETACHABLE SCUBA TANK OVERLAND TRANSPORT DEVICE

BACKGROUND OF THE INVENTION

In recent years scuba tanks have become a common slight on beaches, waterways, lakes and the like, and it is well known that as the air in the scuba tank is nearing depletion, it is necessary for the diver to return to his boat or automobile for rest, or at least for a new air supply.

It is also well known that after considerable exertion, the diver becomes quite tired and carrying the heavy scuba tank overland, even though empty of compressed air, can involve quite an ordeal. Consequently, Robert Henderson and Brian Bahls, in their U.S. Pat. No. 4,815,761 entitled "Amphibious Scuba Assist Devices" were inspired to provide a device assisting the diver to transport scuba tanks and other diving gear across a beach or like land area, or even up or down a set of stairs. Their frame is formed of hollow tubing, and utilizes a wide and buoyant roller 34 formed of a flexible plastic material. That roller is of course designed to permit the user to roll the frame member across sandy areas, thus sparing the diver the ordeal of having to carry his tank. The Henderson et al device will float, so it may also be used as a floating work platform.

Although apparently usable for the intended purpose, the Henderson device is much larger than would be necessary if only one or two scuba tanks were to be transported across a beach or parking lot, therefore involving needless bulk and expense in many instances.

We are aware that others have provided two-wheeled carts, such as the Kellermyer U.S. Pat. No. 4,544,173 entitled "Self-Storing LPG Tank Cart." However, such a device as provided by Kellermyer, while suitable for carrying a propane tank, is not really suitable for carrying a scuba tank.

Accordingly, we were motivated to provide a lightweight wheeled device of simple yet highly effective construction, that will greatly simplify a diver's efforts in transporting his tank across a beach, parking lot or other such land area.

SUMMARY OF THE INVENTION

In accordance with this invention, we have provided a wheeled device for enabling a scuba tank or the like to be moved over land, instead of the user having to carry the heavy item. Our device utilizes an elongate axle, adjacent each end of which a wheel is mounted, which wheels can have a comparatively wide tread so as to enable our device to move readily over grass, sand or other surfaces such as pavement, concrete sidewalks, wooden boardwalks, boat docks and the like.

Our device utilizes a novel pair of tank-engaging members, with each of such members being connected to the axle, with the tank-engaging members being movable about the axle between a nested position, in which the members require minimum storage space, and a position in which the members are separated to a limited extent. Importantly, we utilize means for limiting the separation of the tank-engaging members. One of the tank-engaging members has support means for supporting a scuba tank, and both of these members have a sidewall-engaging portion for engaging the sidewall of a scuba tank inserted between these sidewall-engaging portions, to rest upon the support means. Therefore, when the scuba tank is resting on the support means of the one member, the sidewall engaging portions of the two members tightly grasp the sidewalls of the scuba tank, because of the limited separation permitted by the construction we use, so therefore our novel wheeled device does not drop off should the user lift only the scuba tank.

Our novel concept can take the form in which an axle of increased length is utilized, such that two pairs of tank-engaging members are utilized thereon.

Although we are not limited to any one constructional material, we prefer to use rigid wire in the construction of the tank-engaging members, because of its natural springiness, the considerable strength that is afforded without having to pay a considerable weight penalty, its durability, and the ease with which an attractive coating can be applied thereto.

It is to be noted that the distance between the sidewall-engaging portions can be manually altered to a limited extent, so that scuba tanks of slightly different outside diameters can be carried thereon, with the sidewalls of the tank nevertheless tightly grasped.

Figures 1, 2, 3, 4:
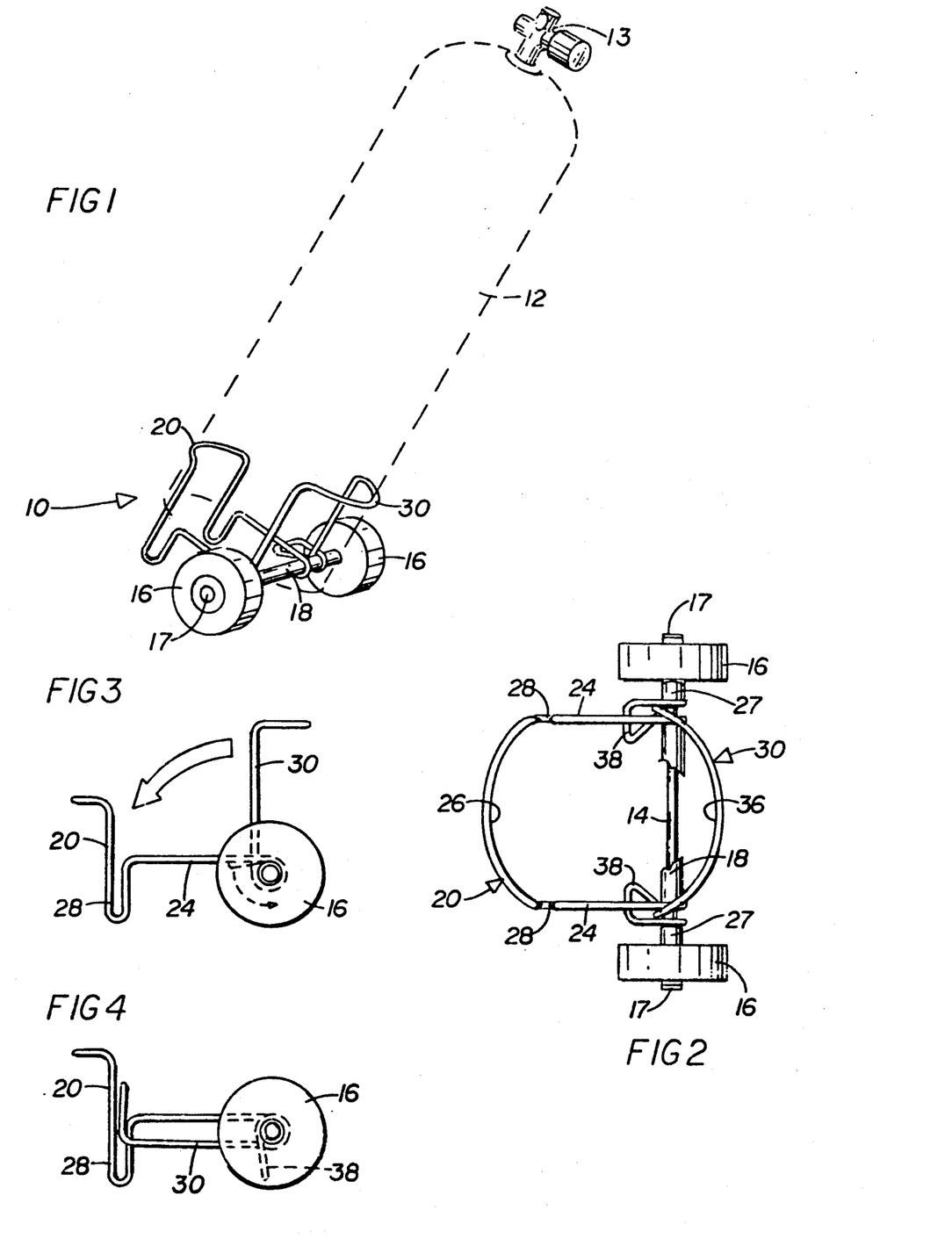
FIG. 1 is a preferred embodiment of a wheeled device or scuba tank transporter in accordance with our invention, showing a scuba tank inserted in approximately the operating position.
FIG. 2 is a view from above of the wheeled device of FIG. 1, with the tank having been omitted in the interests of clarity.
FIGS. 3 and 4 are related figures, with FIG. 3 showing our wheeled device with the sidewall-contacting members in the deployed position, whereas FIG. 4 reveals our device in the collapsed or compacted position, such that the need for storage space is minimized.

A tank is typically transported by inserting it between the tank-engaging members of our device, and then grasping the tank valve with one hand. The tank and the supporting device are then tilted to approximately the position depicted in the first figure of drawing, and thereafter pushed or pulled to the desired destination. In the event of a disparity between the height of the tank and the height of the user, a suitable handle may be removably attached to the tank.

It is therefore to be seen that a principal object of our invention is to provide a wheeled device of strong, lightweight, inexpensive and highly advantageous construction that enables the scuba diver to transport his tank overland without having to carry the tank.

Another object of our invention is to provide a wheeled device of simplified yet desirable construction, that can be readily attached to a scuba tank without the use of any tools, and which will, without falling off, stay attached to the tank for as long as necessary, but which can be readily removed at such time as the tank is ready to be utilized for a dive.

Still another object of our invention is to provide a wheeled device that can be constructed of cold rolled steel wire, fabricated in a minimum length of time by the use of a simple jig, which will possess many desirable features, such as being quickly and removably attached to a scuba tank, and maintaining such attachment despite the fact that the tank is lifted without at the same time providing support for the wheeled device.

Yet still another object is to provide a novel wheeled device able to receive either one or a pair of tanks for overland transport, which will remain tightly yet removably attached to the tank or tanks during lifting into or out of a vehicle.

These and other objects, features and advantages will be apparent from the appended drawings and text material.

DETAILED DESCRIPTION

Our wheeled device for engaging the lower sidewalls of a scuba tank or the like is shown in FIG. 1, for enabling the tank to be rolled over the ground instead of the user having to carry it. In this figure it will be seen that our novel wheeled device 10 is designed and configured to receive a scuba tank 12, with it to be understood that the user may wish to utilize a removable handle attached to the upper portion of the scuba tank during the period that our wheeled device is being used. In such an instance, the valve 13 may serve as the attachment point for the handle.

It will be noted that in FIGS. 11 and 12 we depict a typical handle, of the type which may be removably attached to the valve portion of a scuba tank, which handle will be discussed in some detail hereinafter. It should be mentioned, however, that in many instances a handle is unnecessary, principally being needed only when there is a disparity between the height of the tank and the height of the user.

Figure 5:
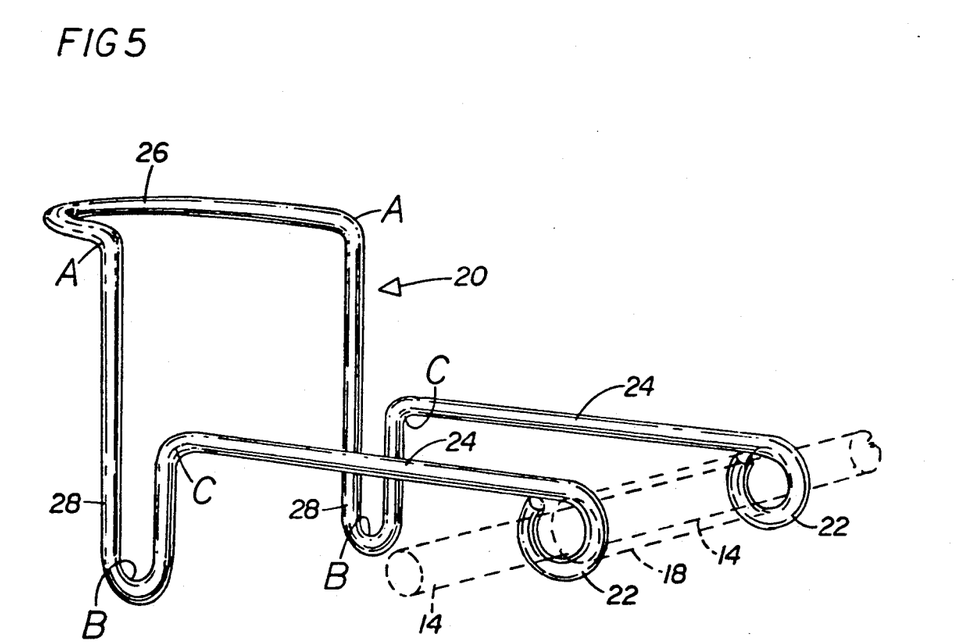
FIG. 5 is a perspective view to a larger scale of the preferred embodiment of the first tank-engaging member, revealing the locations at which desired bends in the steel wire have been created.
Figure 6:
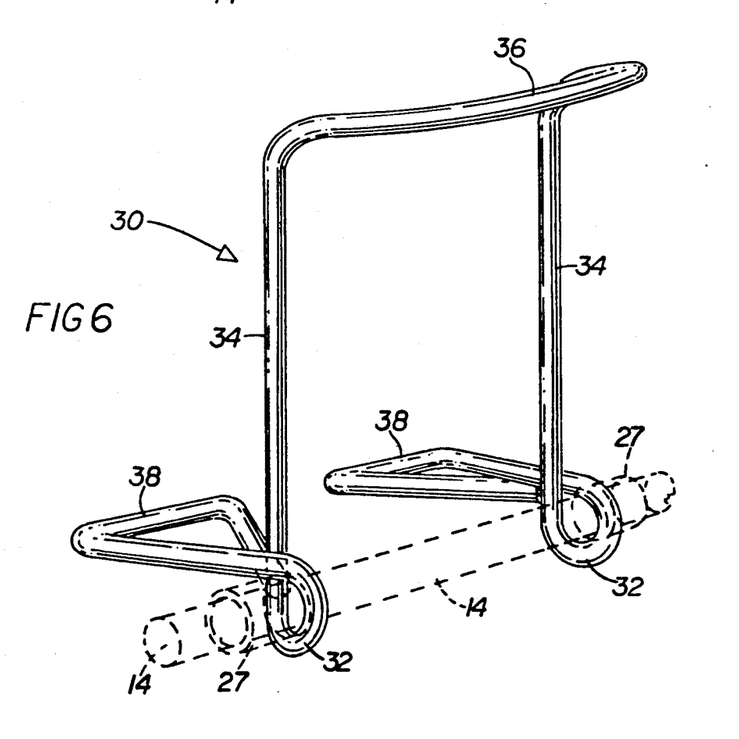
FIG. 6 is a perspective view of a preferred embodiment of the second tank-engaging member, this view revealing the desired angular relationship between the pair of upstanding members, and respective abutment members.

Our wheeled device or personal tank transport 10 has an elongate axle 14, best seen in FIGS. 2, 5 and 6, and adjacent each end of the axle 14, a wide tread wheel 16 is operatively attached, as is visible in FIG. 1 and certain other figures. The wheels are maintained in the desired location on the axle 14 by the use of axle caps 17, as revealed in FIG. 2. We typically utilize a axle covering member 18, which also serves as a spacer member, to be of assistance in maintaining the first tank-engaging member 20 and the second tank-engaging member 30 in the desired relationship. We also utilize a spacer 27 between each wheel and the adjacent portion of the second tank-engaging member.

The first and second tank-engaging members 20 and 30 are mounted on the axle 14, which members are relatively movable for a limited extent about the axle, as will be discussed at greater length hereinafter. FIG. 3 reveals our device with the second tank-engaging member 30 in the deployed position, whereas FIG. 4 illustrates the collapsibility of the device in that it shows the second tank-engaging member in the folded or compacted position. In the latter position our device requires minimal storage space, and can be readily accommodated in a scuba diver's bag.

Returning to further consideration of FIG. 2, it will be seen that the first tank-engaging member 20, in accordance with the preferred embodiment of our invention, is made from a single piece of wire, which for example may be cold rolled steel ¼ inch in diameter, but we obviously are not to be limited to this. It will be clearly seen in FIG. 5 that in accordance with this preferred embodiment, the ends of the wire are bent into a pair of loops 22, through which the axle 14 passes. As previously mentioned, we prefer to utilize an axle covering member 18, to assure that the loops 22 will be maintained a desired distance apart.

Adjacent the loops 22 a tank-supporting portion 24 is defined, which portion is configured to engage and support the bottom surface of a scuba tank. We may also refer to this as being a tank-supporting means or a tank-supporting platform. Adjacent the tank-supporting portion of the first tank-engaging member 20 is the curved sidewall-contacting portion 26, but defined between the tank-supporting portion 24 and the sidewall-contacting portion 26 are the downward extensions 28. These extensions are designed to be in ground contact when the tank 12 is standing upright on the first tank-engaging member 20.

It is to be noted that the downward extensions or ground-contacting members 28 of the first tank-engaging member 20 are of a height related to the size of the wheels 16, so that the members defining the tank supporting portion 24 will be level when the device 10 is at rest. By virtue of the first tank-engaging member 20 preferably being configured from a single piece of cold rolled steel wire, the axle-encircling portions 22, the tank supporting portion 24, the downward extensions 28 and the sidewall-contacting portion 26 can be regarded as representing integral construction.

In FIG. 5 it will also be noted that at points A, 90° bends have been formed, whereas at points B, there exist 180° bends, and at points C, 90° bends have been created. The radius of the curvature of the sidewall-contacting portion 26 is such as to closely conform to the radius of the scuba tank that is to be carried.

Although we are not to be limited to any certain constructional procedure, we have been successful in creating the first tank-engaging member 20 by cutting the cold rolled steel wire of ¼ inch diameter into a certain length; placing the midpoint of the length of wire on a jig having a desired curvature; clamping the midpoint of the wire to the center of the curved portion of the jig, and then proceeding to bend the wire into the desired configuration. We typically start the procedure by bending the portion 26 of the steel wire at room temperature, whereas the bends at points A, B and C, being more severe, are achieved by elevating the temperature at such locations by suitable means. One example of this is the use of a welder's torch, but other possibilities exist.

From FIGS. 1, 3, 9 and 10 it can be clearly seen that the sidewall-contacting portion 26 is located a few inches above the tank-supporting means or portion 24, so that the tank sidewalls can be snugly grasped as a result of the particular relationships designed to exist between the first tank-engaging member 20 and the second tank-engaging member 30. Sidewall-contacting portion 36 of the second tank-engaging member 30 is in a particular relationship to the sidewall-contacting portion 26, and because of the importance of this relationship, it will be discussed at greater length hereinafter.

Turning now to FIG. 6, it will there be seen that the second tank-engaging member 30 has a pair of loops 32 through which the axle 14 extends, with a pair of upstanding members 34 continuing upwardly from the loops 32. The curved sidewall-contacting portion 36 is formed at a location between the upstanding members 34, and like sidewall-contacting portion 26, the portion 36 is formed on a radius closely conforming to the radius of the tank to be carried. As will be subsequently discussed, when the first and second tank-engaging members have been placed in assembled relationship, the sidewall-contacting portion 36 is spaced from the sidewall-contacting portion 26 of the first tank-engaging member 20 for a distance approximately coinciding with the diameter of the tank, such as a scuba tank, that is to be transported overland.

Figure 7:
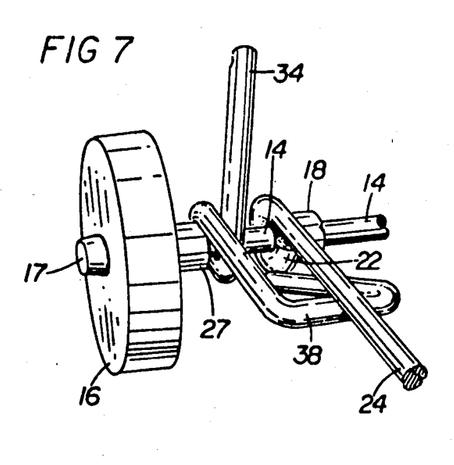
FIGS. 7 and 8 are related fragmentary figures, with FIG. 7 revealing in fragmentary form, the relationship of an abutment member to a tank-supporting member when the upright member associated with the abutment member is in the deployed position, whereas FIG. 8 reveals how the abutment member moves away from the tank-supporting member when the upright member has been moved into the folded position.
Figure 8:
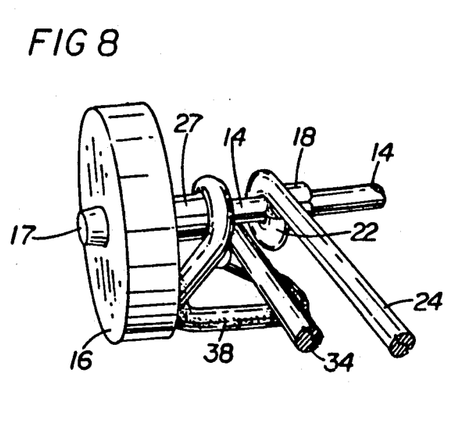

It is to be realized that the loops 32 are not formed at the very ends of the wire constituting the second tank-engaging member 30, but rather after the formation of the loops 32, the ends of this piece of wire are each bent into somewhat of a triangular configuration, so as to create a pair of abutments 38 outboard of the loops 22 of the first tank-engaging member 20. FIGS. 6, 7 and 8 reveal this detail. The plane of the abutments 38 is such as to form a fixed and highly advantageous relationship with the upstanding members 34, preferably an angle of approximately 90°. We configure the width of the abutments to be such as to assure desirable contact with the underside of portions 24 of the first tank-engaging member 20, which arrangement in effect serves as a restraint or stop means limiting the separation of the sidewall-engaging portions 26 and 36.

It has been previously mentioned that the first and second tank-engaging members 20 and 30 are relatively movable, with this relative movement being in a rotative sense about the axle 14. By now it should be clear that the role played by the aforementioned abutments 38 is such as to establish how far apart the sidewall-contacting portions 26 and 36 can be moved, which is a critical feature inasmuch as it is desired for the sidewall-contacting portions to tightly grasp the sidewalls of the scuba tank inserted therebetween. The sidewall-grasping relationship we establish by the use of the spaced apart members 26 and 36 is not so tight as to inhibit the insertion of the bottom of the scuba tank into the space between the sidewall-contacting portions 26 and 36, and into contact with the tank support members 24. The functioning of the abutments 38 in contact with the underside of the members 24, as clearly visible in certain figures including FIG. 7, is such as to bring about a degree of bending of the members 20 and 30 at the time of tank insertion, and as a consequence, the development of substantial friction between the scuba tank and the sidewall-contacting portions 26 and 36. This frictional relationship is sufficiently tight as to enable out wheeled device 10 to stay attached to the scuba tank 12 even though the user lifts the tank without supporting the wheeled device 10.

With reference now to closely related fragmentary FIGS. 7 and 8, it will be noted that we have shown one wheel 16 in its relationship to the axle 14, and in these figures we also reveal a part of the tank-supporting portion 24 of the first tank-engaging member 20.

In FIG. 7 we reveal a fragmentary portion of an upstanding member 34 of the second tank-engaging member 30 which, as previously mentioned, is in a fixed angular relationship to the abutment member 38, preferably at approximately a right angle; note FIG. 4. It is to be noted in the instance depicted in FIG. 7 that the abutment member 38 is in firm contact with the underside of tank-supporting portion 24, and this is of significance in that this is the specific means we utilize for limiting the distance that the upstanding members 34 and therefore the sidewall-contacting portion 36 can be separated from the sidewall-contacting portion 26.

In order to make it possible for our wheeled device 10 to require the least amount of storage space, we configure the tank-engaging members 20 and 30 to be able to be moved into a compacted relationship, as previously mentioned, so when the upstanding member 34 is moved from the upright position shown in FIG. 7, to the position illustrated in FIG. 8, this causes the abutment 38 to move away from contact with the underside of the tank-supporting portion 24. In a manner of speaking, FIGS. 7 and 8 are analogous to FIGS. 3 and 4, in that FIGS. 7 and 3, the second tank-engaging member is in the upright position, and in FIGS. 8 and 4, the second tank-engaging member is in the folded position.

Figures 11, 12, 13:
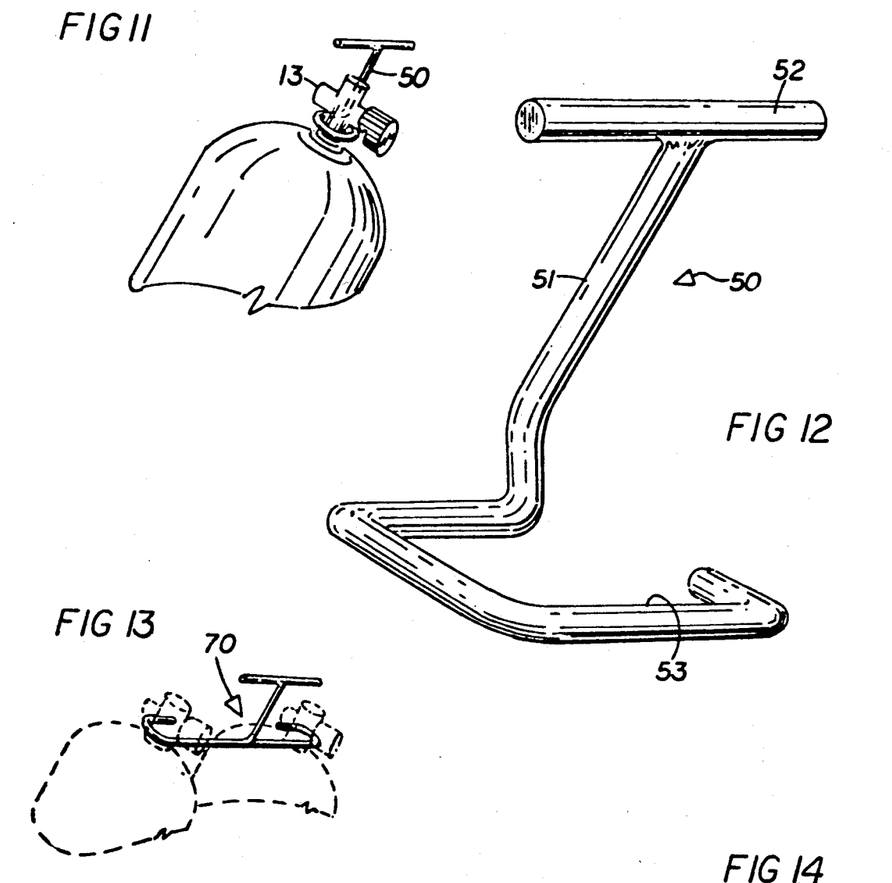
FIG. 11 is a fragmentary view of the top of a tank, showing how a preferred form of handle can be removably attached, to be of assistance to the user in moving the tank overland from one site to another.
FIG. 12 is a perspective view to a larger scale of an exemplary form of removable handle that may optionally be used with our wheeled device.
FIG. 13 is a view to a small scale of an arrangement employing a form of double handle.

It was previously mentioned that in the event of a disparity of height between the user and the particular scuba tank that has been inserted into our wheeled device, a removable handle could be attached, and FIG. 11 reveals that a handle 50 can be removably attached to the valve 13, thereby simplifying the task of the user in rolling the tank from one site to another.

FIG. 12 illustrates one suitable configuration of such a removable handle 50, and this figure reveals a shank portion 51, at the top of which a hand-contacting portion 52 is secured, such as by welding. On the other end of the shank portion from the hand contacting portion is a curved, hook-shaped portion 53 that has a three-sided configuration, with the fourth side left open so that the hook-shaped portion can be readily inserted around the valve 13 of the tank 12. Upon being applied to the valve in the manner shown in FIG. 11, the user can apply as much force to the handle 50 as is necessary in order to cause the wheeled device to travel overland through grass, sand or the like to the selected destination. We typically construct the handle 50 of the same diameter material as the components of our wheeled device.

In FIG. 13 we reveal a handle embodiment 70 designed particularly to be utilized with the valves of a pair of side-by-side scuba tanks. A loop is created at each end of this double type of handle 70, with the user possibly finding it desirable to move the valves of the two tanks closer together at the time of handle insertion. As in the other handle embodiment, the double handle is optionally usable, and can be readily removed from the tanks when the destination has been reached.

Figure 14:
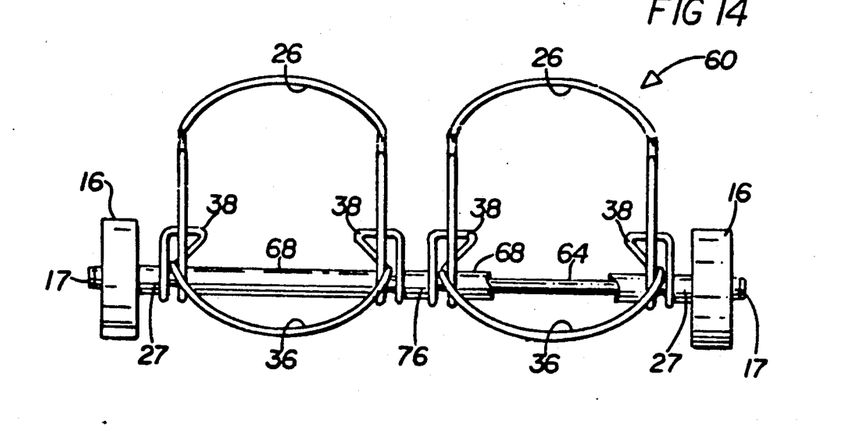
FIG. 14 is a view from above of a tandem version of our invention, upon which a pair of tanks can be mounted and then moved from one location to another.

In FIG. 14 we reveal by the utilization of a plan view, an embodiment of our invention particularly designed to be used with a pair of scuba tanks disposed in a side-by-side arrangement. In the tandem arrangement 60 illustrated in FIG. 14, it is to be noted that we have, in effect, utilized a first tank-engaging member and associated second tank-engaging member on each end of a long axle 64. Because both ends of the preferred form of a dual width device are basically made up of the same first tank-engaging member and second tank-engaging member as described hereinbefore, this arrangement enables a single scuba tank to be inserted between such members on either the left or on the right of the device 60 shown in FIG. 14, or, alternatively, a scuba tank can be inserted between the first and second sidewall-contacting portions 26 and 36 on both sides of the device.

As before, each pair of tank-engaging members utilized on the long axle 64 are designed and configured to clasp the sidewalls of the inserted scuba tank very carefully. This means that the user can readily remove one tank from the device 60 shown in FIG. 14 without disturbing the other tank supported by the device.

To keep each pair of the first and second tank-engaging members in the desired relationship, we utilize a separate spacer member 68 around each respective half of the long axle 64, which spacer members serve to some degree in providing desired rigidity to the long axle 64. A spacer 76 is utilized on the long axle 64 between the two pairs of tank-engaging members.

In addition, we utilize a pair of spacers 27 adjacent each of the wheels 16, to serve the same purpose as was involved in the single tank embodiment of our invention discussed hereinabove.

It should now be clear that our wheeled device configured to accommodate two scuba tanks is basically two individual devices placed side by side on a single axle. It is obvious that each of the two devices so placed can work independent of each other in the manner of the individual wheeled device, as well as together. This configuration uses a larger diameter axle to accommodate the additional weight of the second scuba tank. We have found that for the single tank embodiment, the axle 14 can be 5/16" diameter steel rod without undue flexing, whereas for axle 64, we find it desirable to construct it out of ⅜" diameter steel rod. Quite obviously we are not to be limited to these diameters.

It was of course earlier pointed out that the preferred construction for the members 20 and 30 involves the use of rigid wire, such that these members possess a degree of natural springiness. This feature is used to advantage in these preferred embodiments of our invention, in that as the pair of abutments 38 come into contact with the undersurface of members 24, a desirable amount of resistance is encountered, effectively preventing the sidewall-contacting portions 26 and 36 from moving apart beyond a certain point. This point is of course the condition or circumstance in which the sidewall-contacting portions 26 and 36 tightly tightly grasp the lowermost portion of the sidewalls of the inserted scuba tank. This of course is the reason why our device is able to stay frictionally attached to the scuba tank, should the user lift the tank without touching the wheeled device.

We have previously mentioned that we are not to be limited to the use of cold rolled steel wire of ¼ inch diameter as the constructional material used for the creation of our device, and as a matter of fact, the tank-engaging members could be made of hot rolled steel, stainless steel, aluminum rod, hollow plastic PVC pipe, hard plastic and wood.

Each of these materials will produce fundamentally the same device, but we have determined cold rolled steel to be the preferred material because the tempering (hardening) of the steel resulting from the application of heat during the manufacturing process followed by quenching produces a better load-carrying capacity and requires fewer cosmetic operations on the bent surfaces prior to the finish coating.

Hot rolled steel does not temper to the same degree as cold rolled steel when heat is applied, and the diameter of a hot rolled steel rod tends to vary somewhat from point to point. Stainless steel is extremely expensive and also tends to flake excessively at points where bends occur. Aluminum rod does not have the tensile strength of steel and requires the device to be made of a larger diameter rod, making the entire device bulkier and somewhat more unwieldy. The same is true of the PVC pipe. The hard plastic must be molded, which usually is not economically feasible. Use of wood requires a considerable number of extra steps in the manufacturing process and is less durable than our preferred material, cold rolled steel. Nonetheless, it is entirely possible to construct our device from any of these somewhat less desirable materials.

An additional point to be considered when using cold rolled steel wire is that the user can rather readily convert one of our wheeled devices from a configuration closely accepting a scuba tank not equipped with a rubber (or plastic) boot, into a configuration in which the sidewall-contacting portions will tightly grasp a scuba tank that has been provided with a rubber boot. In other words, we do not have to manufacture our wheeled devices in two different sizes in order to be able to accommodate scuba tanks equipped with or not equipped with rubber or plastic boots.

It should now be well understood that although the cold rolled steel wire is initially soft enough to deal with insofar as readily permitting the room temperature creation of the desired curvature of the sidewall-contacting portions 26 and 36, upon the worker using elevated temperature in the creation of bends in the first tank-engaging member 20, such as at A, B and C in FIG. 5, and thereafter plunging the completed member into cold water, a desirable degree of heat treatment is brought about. This of course assures the member 20 having a desirable amount of hardness and springiness.

In the creation of the second tank-engaging member 30 depicted to a large scale in FIG. 6, we likewise create the sidewall-contacting portion 36 under room temperature conditions, but thereafter we typically create the bends at the top of members 34, the loops 32, and the abutment members 38 after heating the wire to a sufficient temperature as to readily permit desired bends to be created. Thereafter, the completed component 30 is typically plunged into cold water, thus to achieve a desirable amount of tempering, and a suitable amount of springiness in the tankengaging member 30. As a consequence of these procedures, the sidewalls of the inserted tank will be tightly grasped by the sidewall-contacting portions 26 and 36.

Figure 9:
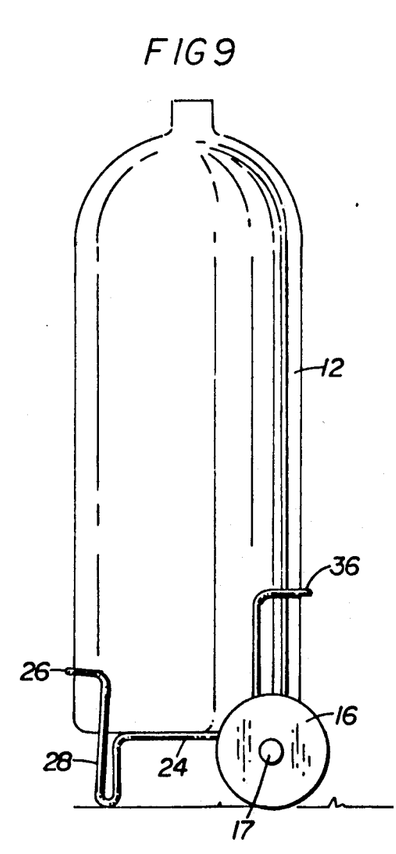
FIG. 9 is a view revealing our wheeled device or tank transport member at rest, in this instance the device being used in conjunction with scuba tank having plain sidewalls.

With reference to FIG. 9, which illustrates a scuba tank 12 having no rubber (or plastic) boot, it will be noted that the left and right members constituting the downward extension(s) 28 have been moved somewhat together, so as to cause the sidewall-contacting portion 26 to be a relationship with the sidewall-contacting portion 3 such that the opposite sides of the scuba tank are tightly grasped. The distance inwardly that the sidewall-contacting portion 26 has been moved has been somewhat exaggerated in FIG. 9, in the interests of clarity. Another way that the sidewall-contacting portion 26 can be effectively biased toward the sidewall-contacting portion 36 is by causing the bends at points C in FIG. 5 to be increased, that is, the distance between the downwardly extending portion and the tank-supporting portion 24 is increased.

Still another option is for the distance between the upstanding members 34 in FIG. 6, and the abutment members 38 being diminished. Still other options may be utilized. The result of these possible alternatives is that the use of steel wire as the medium from which each of the tank-engaging members is created is particularly advantageous in permitting a rather wide range of diameters of scuba tanks to be accommodated, with this being achieved from a single manufactured item.

Figure 10:
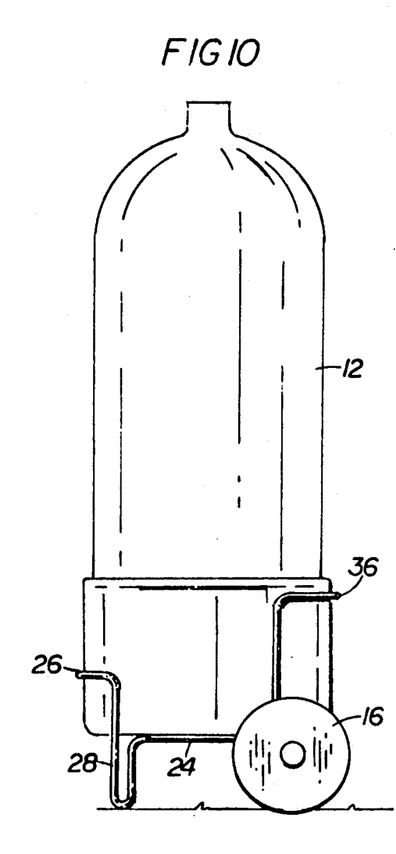
FIG. 10 is a view of the same wheeled device as depicted in FIG. 9, but with the sidewall-contacting members having been moved further apart in order that a scuba tank equipped with a boot of rubber, plastic or the like can be tightly accommodated.

FIG. 10 represents a scuba tank that has been equipped with a rubber or plastic boot, so the sidewall-contacting portions 26 and 36 should be caused to be a distance apart such that the boot can be tightly grasped. We prefer for the left and right members constituting the downwardly extending portion 28 to be an equal distance apart when a booted scuba tank is being dealt with, with the sidewall-contacting portions 26 and 36 having sufficient ability to tightly grasp the sidewalls of the boot in this instance.

As is obvious, we can designate our wheeled devices as accommodating a tank with boot, or a tank without boot as they leave the factory, but our advantageous design is such as to permit the user to reconfigure his device in the field, so that it can readily used with either type of scuba tank, while still possessing desirable sidewall-engaging qualities.

Upon completion of the manufacturing of the components of our novel device, a colored coating is applied to all the various parts prior to final assembly, for aesthetic appeal. A number of commercial coatings are available, and some examples of these coatings are: powder coat (a dry, baked-on paint), chrome plate, liquid plastic and rubber; and various types of sprayed on wet paints, either automotive or marine type. We prefer the powder coat, for we find that the powder coat finish in various colors produces a deep, rich-looking, shiny finish which is also quite durable.

Before the powder coat is applied, we first place the tankengaging members and certain other components in traveling racks, which are suited for being hung on an overhead conveyor line. Such a conveyor line may be adjusted to travel, for example, at a rate of six feet per minute. At this time the members and components are first introduced to a potassium bath, in order to remove impurities from the surfaces to be painted. After leaving the potassium bath, the members continue to travel on the overhead conveyor line through a warm forced-air dryer. Thereafter, these members and components pass through a spray paint booth where the selected color of dry paint is applied.

The final step in the application of this finish to the members and components is to cause them to pass through a bake booth, where they are preferably baked at 450° Fahrenheit for a period of twenty minutes, which both sets and hardens the paint to a durable finish.

Many of our customers prefer a chrome finish, which involves a substantially different procedure. Chrome plating is conventionally accomplished by inserting the disassembled members and components into a tank containing a suitable electrolytic bath as well as an anode and a cathode. The members to be chrome plated are connected to the cathode, and a bar of chrome is connected to the anode. Arranging for an electrical current to flow through the electrolytic solution in the tank causes the chrome to move from the chrome bar and to be deposited on the tank-engaging members as well as on the ancillary components.

We have found that liquid plastic and rubber finishes tend to be difficult to apply and to produce unsightly bulges at those places where the device is joined together. The automotive and marine wet paints produce satisfactory aesthetic results, but lack the durability of both powder coat and chrome plate.

Other embodiments of our invention may be obvious from the foregoing, and we are not to be limited to the embodiment utilizing steel wire, nor the embodiments configured as illustrated herein except as required by the scope of the appended claims.

We claim:
1. A wheeled device for enabling a scuba tank or the like to be moved overground, instead of the user having to carry it, said device having an elongate axle, adjacent each end of which a wheel is mounted, and a pair of tank-engaging members, said members being operatively mounted with regard to said axle and movable between a nested position, in which said members require minimum storage space, and a tank-receiving operative position in which said members are separated to a limited extent, a first of said members having support means for supporting a surface of the tank, each of said members having a sidewall-engaging portion for engaging the sidewall of the tank inserted between said sidewall-engaging portions, to rest upon said support means, at least one of said members possessing natural springiness, stop means for controlling the extent of separation of said members when said member possessing natural springiness undergoes a degree of bending as a result of the tank being inserted between said members and is resting on said support means of said first member, said sidewall-engaging portions of both members thus tightly grasping the sidewalls of the tank, such that said wheeled device does not drop off should the user lift only the tank.

2. The wheeled device for enabling a scuba tank or the like to be moved overground as recited in claim 1 in which both of said tank-engaging members are made of rigid wire having natural springiness.

3. The wheeled device for enabling a scuba tank or the like to be moved overground as recited in claim 1 in which the distance between said sidewall-engaging portions at the time of being separated to the maximum extent, can be manually altered an incremental amount, so that tanks of slightly different outside diameters can be carried thereon, with the sidewalls of the tank tightly grasped.

4. The wheeled device for enabling a scuba tank or the like to be moved overground as recited in claim 1 in combination with an optionally usable detachable handle that may be employed upon an upper portion of a tank carried by said wheeled device, said handle being usable in the event of a disparity between the height of the tank and the height of the user.

5. The wheeled device for enabling a scuba tank or the like to be moved overground as recited in claim 1 in which said one member has ground-contacting means sized in consonance with the radius of said wheels, such that said support means on said one member will be substantially horizontally disposed at such time as a tank resting thereon is not being moved.

6. The wheeled device for enabling a scuba tank or the like to be moved overground as recited in claim in which said tankengaging members can be nested in a compacted relationship when not carrying a tank.

7. The wheeled device for enabling a scuba tank or the like to be moved overground as recited in claim 1/in which said elongate axle is long enough to accommodate two pairs of tank-engaging members, each of such pairs being separately able to be moved into a compacted relationship, and each of said pairs being separately able to be moved into a fully operational relationship.

8. A wheeled device for engaging the lower sidewalls of a scuba tank or the like, for enabling the tank to be rolled over the ground from one site to another instead of having to be carried, said wheeled device having an elongate axle, adjacent each end of which a wheel is operatively attached, first and second tank-engaging members operatively mounted with respect to said axle, which members are relatively movable between a nested position and a tank-receiving operative position in which said members are separated to a limited extent, with at least one of said members possessing natural springiness, stop means for controlling the extent of separation of said members when moved to the tank-receiving position, said first tank-engaging member having a tank-supporting portion configured to engage and support the bottom surface of a tank, with a curved sidewall-contacting portion integral with said tank-supporting portion and located a few inches above said tank-supporting portion, said second tank-engaging member having a curved sidewall-contacting portion spaced from the sidewall-contacting portion of said first tank-engaging member for a distance approximately coinciding with the diameter of the tank to be transported, at least one of said members capable of being restrained by said stop means, thus to control the extent of separation of said members when said member possessing natural springiness undergoes a degree of bending when the tank has been inserted between said curved sidewall-contacting portions and is resting on said first tank-engaging member, such that said device will stay frictionally attached to the tank, should the user lift the tank without touching said wheeled device.

9. The wheeled device for engaging the lower sidewalls of a scuba tank as recited in claim 8 in which said sidewall-contacting portions are made of cold rolled steel wire.

10. The wheeled device for engaging the lower sidewalls of a scuba tank as recited in claim 8 in which said tank engaging-members are created out of rigid wire, with one piece of wire being configured to define the tank-supporting portion as well as the sidewall-engaging portion of said first tank-engaging member, and a separate piece of wire being utilized for creating said second tank-engaging member.

11. The wheeled device for engaging the lower sidewalls of a scuba tank as recited in claim 8 in which one of said tank-engaging members is rotatable about said axle with respect to the other one, so as to permit compacting such that the storage space required by said device is substantially reduced.

12. The wheeled device for engaging the lower sidewalls of a scuba tank as recited in claim 8 in which one of said tank-engaging members has an integral abutment, said abutment being placed to inhibit separation of said members beyond the point at which the sidewalls of the tank being accommodated are tightly engaged by said sidewall-contacting portions.

13. The wheeled device for enabling a scuba tank or the like to be moved overground as recited in claim 8 in which the distance between said sidewall-engaging portions at the time of maximum extension can be manually altered to a limited extent, so that tanks of slightly different outside diameters can be carried thereon, with the sidewalls of the tank in each instance being tightly grasped.

14. The wheeled device for enabling a scuba tank or the like to be moved overground as recited in claim 8 in which said one member has ground-contacting means sized in consonance with the radius of said wheels, such that said tank-supporting portion on said first tank-engaging member will be substantially horizontally disposed at such time as a tank resting thereon is not being moved.

15. The wheeled device for enabling a scuba tank or the like to be moved overground as recited in claim 8 in which said elongate axle is long enough to accommodate two pairs of tank-engaging members, each of such pairs being separately able to be moved into a compacted relationship, and each of said pairs being separately able to be moved into a fully operational relationship.

16. A wheeled device for enabling one or a pair of scuba tanks to be moved overground from one site to another, instead of the user having to carry same, said device having an elongate axle, adjacent each end of which a wheel is mounted, and at least one pair of tank-engaging members, with each member of said pair of members being pivotally connected to said axle, said pair of tank-engaging members being movable about said axle between a nested position, in which said members require minimum storage space, and a tank-receiving operative position in which said members are separated to a limited extent, and stop means for limiting the separation of said tank-engaging members, one of said members having support means for supporting a scuba tank, each of said members having a sidewall-engaging portion for engaging the sidewall of a scuba tank inserted between said sidewall-engaging portions, to rest upon said support means, at least one of said members possessing natural springiness and capable of being restrained by said stop means, for controlling the extent of separation of said members when said member possessing natural springiness undergoes a degree of bending when the tank has been inserted between said members and is resting on said support means of said one member, said sidewall-engaging portions of both members tightly grasp the sidewalls of the scuba tank, such that said wheeled device does not drop off should the user lift only the scuba tank.

17. The wheeled device for enabling a scuba tank or the like to be moved overground as recited in claim 16 in combination with an optionally usable detachable handle that may be employed upon an upper portion of a tank carried by said wheeled device, said handle being usable in the event of a disparity between the height of the tank and the height of the user.

18. The wheeled device for enabling a scuba tank or the like to be moved overground as recited in claim 17 in which said detachable handle is connectable only with a single tank.

19. The wheeled device for enabling a scuba tank or the like to be moved overground as recited in claim 12 in which said detachable handle is connectable with both tanks, when two are being transported.

20. A wheeled device for engaging the lower sidewalls of a scuba tank or the like, for enabling the tank to be rolled over the ground from one site to another instead of having to be carried, said wheeled device having an elongate axle, adjacent each end of which a wheel is mounted and first and second tank-engaging members operatively connected to said axle and movable between a nested position and a tank-receiving operative position in which said members are separated to a limited extent, with at least one of such tank-engaging members possessing natural springiness, stop means for controlling the extent of separation of said members when moved to the tank-receiving position, said first tank-engaging member having a tank-supporting portion configured to engage and support the bottom surface of a tank, with a curved sidewall-contacting portion integral with said tank-supporting portion and located a few inches above said tank-supporting portion, said second tank-engaging member having a curved sidewall-contacting portion spaced from the sidewall-contacting portion of said first tank-engaging member for a distance somewhat less than the diameter of the tank to be transported, at least the tank-engaging member possessing natural springiness and capable of being restrained by said stop means to limit separation of said members when the tank has been inserted between said curved sidewall-contacting portions and is resting on said first tank-engaging member, such natural springiness causing the tank to be tightly gripped, said device therefore staying frictionally attached to the tank should the user lift only the tank, and not at the same time provide support for said wheeled device.

* * * * *